(12) United States Patent
Hodroj

(10) Patent No.: US 10,021,021 B2
(45) Date of Patent: Jul. 10, 2018

(54) BROADBAND FALLBACK FOR ROUTER

(71) Applicant: T-Mobile USA, Inc., Bellevue, WA (US)

(72) Inventor: Samir Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 54 days.

(21) Appl. No.: 14/979,363

(22) Filed: Dec. 22, 2015

(65) Prior Publication Data

US 2017/0180244 A1    Jun. 22, 2017

(51) Int. Cl.
*H04L 12/707*    (2013.01)
*H04L 29/06*     (2006.01)
*H04L 12/801*    (2013.01)
*H04L 12/803*    (2013.01)

(52) U.S. Cl.
CPC ............ *H04L 45/22* (2013.01); *H04L 47/122* (2013.01); *H04L 47/19* (2013.01); *H04L 69/22* (2013.01)

(58) Field of Classification Search
CPC . H04L 41/0654; H04L 41/0668; H04L 45/22; H04L 45/28
See application file for complete search history.

(56) References Cited

U.S. PATENT DOCUMENTS

| | | | |
|---|---|---|---|
| 5,786,773 A | 7/1998 | Murphy | |
| 6,546,492 B1 | 4/2003 | Walker et al. | |
| 7,957,394 B1 | 6/2011 | Cohen et al. | |
| 8,018,850 B2 | 9/2011 | Beek et al. | |
| 8,184,550 B2 | 5/2012 | Beck et al. | |
| 2003/0072304 A1 | 4/2003 | Gummalla et al. | |
| 2005/0021968 A1 | 1/2005 | Zimmer et al. | |
| 2005/0174935 A1* | 8/2005 | Segel ............... | H04L 45/22 370/228 |
| 2006/0005046 A1 | 1/2006 | Hars | |
| 2006/0143600 A1 | 6/2006 | Cottrell et al. | |
| 2009/0228697 A1 | 9/2009 | Kurashige | |

OTHER PUBLICATIONS

Abrahamsson, Security Enhanced Firmware Update Procedures in Embedded Systems, 2008.
Jones, Exploiting Embedded Devices, SANS Institute, 2012.
Ramsdell, Request for Comments 2633—S/MIME Version 3 Message Specification, 1999.
Shade, Implementing Secure Remote Firmware Updates, 2011.
Non-Final Office Action for U.S. Appl. No. 14/979,336, dated May 23, 2017, 39 pages.
Non-Final Office Action for U.S. Appl. No. 14/872,029, dated Apr. 7, 2017, 13 pages.
Final Office Action for U.S. Appl. No. 14/872,029, dated Oct. 19, 2017, 23 pages.

* cited by examiner

*Primary Examiner* — Pao Sinkantarakorn
(74) *Attorney, Agent, or Firm* — Han Santos, PLLC

(57) ABSTRACT

Systems for routing data over first and second broadband network. A router includes a first network interface that is configured to provide communication via a first broadband channel. There is a second network interface configured to enable communication via second broadband channel. In various embodiments, the first and second broadband channels may be used to provide failover, load balancing, and/or secure transmission of communication data.

20 Claims, 6 Drawing Sheets

BROADBAND FALLBACK FOR ROUTER

BACKGROUND

In recent years, the use of routers has become increasingly popular. A router is a networking device that forwards data packets from one computer network to another through the networks that comprise the Internet, until the data packets reach their destination. Routers are found in homes and offices and are typically used to pass data, such as email, IM, multimedia, and web pages, between a computer and the Internet. At home, a router may be in the form of a cable or digital subscriber line (DSL) router that connects to the Internet through an ISP. More advanced routers, such as enterprise routers, connect large business or ISP networks to core routers that forward data at advanced speeds.

Today, wireless routers are the heart of local Wi-Fi networks, allowing users to connect to the Internet at home with any wireless device, such as a laptop, tablet computer, smartphone, etc., when coupled with an internet service provider (ISP). A home wireless router is often included during the installation of Internet access by the user's internet service provider (ISP). Such routers are typically provisioned with a broadband interface that couples with a modem to communicate with an external network via a cable or DSL broadband channel.

However, when the broadband channel is severed or simply overloaded, conventional routers may not be able to provide continuous availability or quality of service (QoS) because there may not be an alternative broadband channel to use. More particularly, conventional routers that have a single broadband connection do not provide failover to or from a cellular network. Further, conventional routers do not provide load balancing of data flow over both a wired broadband connection and a cellular network. Still further, conventional routers may not adjust the type of external broadband connection based on the security sensitivity of the data to be routed. It is with respect to these considerations and others that the present disclosure has been written.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

This disclosure is related to systems and techniques for providing a router traffic optimization engine for a router. A router intelligence layer determines whether a failover condition exists, whether communication data is to be transmitted via a cable or DSL broadband interface or via a cellular interface to provide continuous external network availability. For simplicity, the discussion herein will refer to "cable broadband" while it will be understood that DSL broadband is supported as well.

In some embodiments, communications interfaces present in the router may comprise: one or more unlicensed communications interface, which may be an interface allowing communications at a short range without being required to operate under terms set forth by government and/or companies, such as Wi-Fi or Bluetooth; a third-party communications interface, which may be an interface allowing communications with an ISP, such as cable broadband, digital subscription line (DSL), and/or satellite broadband; and a licensed communications interface, which may be an interface allowing communications with the carrier of cellular communications, such as LTE broadband or LTE-Advanced.

In one aspect, the intelligence layer of the router balances the data traffic load between the cable broadband interface and the cellular interface. In another aspect, additional communication data security is provided by the router identifying sensitive communication and routing the sensitive information over a dedicated secure broadband channel.

Example System Architecture

Figure 1:
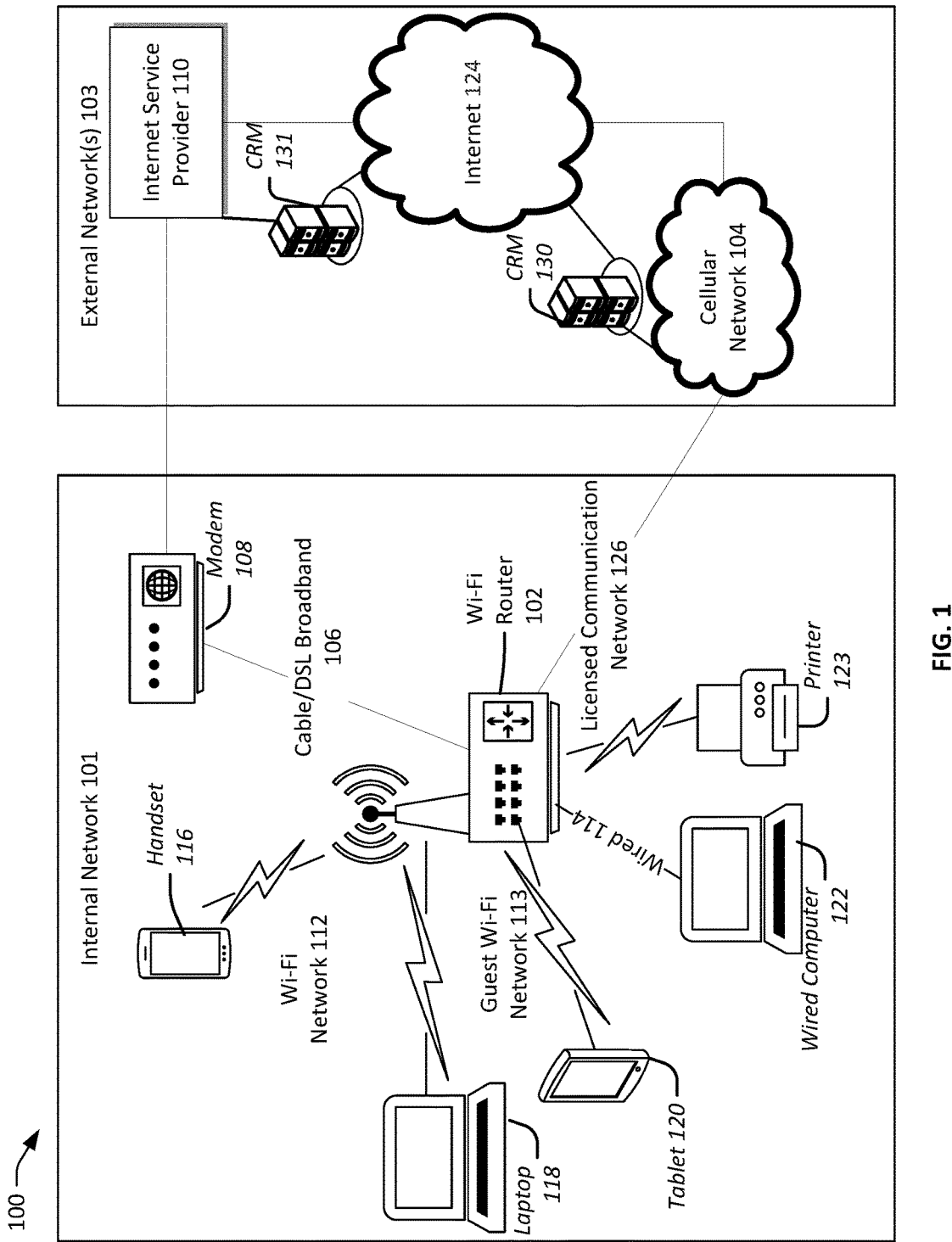
FIG. 1 illustrates an example architecture for implementing a router with multiple broadband options.

FIG. 1 illustrates an example architecture for implementing traffic an optimization for a home-based router. System 100 includes a Wi-Fi router 102 that may be in communication with various user equipment (UE), illustrated by way of example in FIG. 1 in the form of a handset 116, laptop 118, tablet 120, wired computer 122, and a printer 123. It will be understood that other computing devices, such as set top boxes, gaming consoles, smart watches, and other UE that typically communicate via a Wi-Fi router, are supported as well. The connection between a UE and the Wi-Fi router 102 may be wireless (e.g., 112) via an unlicensed data communications channel (e.g., Bluetooth or Wi-Fi) or wired 114 (e.g., via Ethernet cable).

Accordingly, various UE may interact with the Wi-Fi router 102 to exchange data with other UE that are serviced by the Wi-Fi router 102 and/or to communicate with one or more external networks 103, such as the internet 124. To that end, the Wi-Fi router 102 is connected via a third party communications interface, such as cable broadband 106, to a cable modem 108. The cable modem 108 is connected to a third party communications provider, such as an Internet Service Provider (ISP) 110, that provides access to the internet 124. The Wi-Fi router 102 also includes a licensed communications interface over a licensed communication network 126 to a cellular network 104. The functionality of connecting to the cellular network may be provided by a dongle, which is a piece of hardware that attaches to the router 102 via a USB or other serial interface to provide cellular data service therefor. In one embodiment, the components of the dongle may be embedded (e.g., part of)) the hardware of the router 102.

In one embodiment, system 100 includes one or more Customer Relationship Manager (CRM) servers 130, 131. For example, CRM 130 may be related to the ISP 110, whereas CRM 131 is related to the cellular network 104 provider. In one embodiment, the CRM server 130 offers its account holders (e.g., subscribers to the cellular network 104) on-line access to a variety of functions related to the account holders' account, such as on-line payment information, subscription preferences, password control, bandwidth consumption information, etc. To that end, the CRM server 130 may provide the user an interface via the Internet 124. Hence, UE may be used to access on-line information a user's cellular account, which the cellular carrier makes available via the carrier's web site accessible through the Internet 124.

The CRM 131 may provide substantially similar functionality (as CRM 130) to the account holder of the ISP 110. In one embodiment, the functionalities of CRM 130 and CRM 131 are combined on a single server platform (e.g., CRM 130 represents both the ISP 110 and cellular network 104). In one embodiment, CRM 130 (and/or CRM 131), may be used by the router 102 to determine relevant account status information to decide whether to route the communication data traffic of the one or more UE via cable broadband 106 or the licensed communication network 126, or in what proportion thereof.

Accordingly, the Wi-Fi router 102 includes an intelligence layer that is operative to route traffic either via the third party communications network (e.g., cable broadband 106) or the licensed communication network 126 based on one or more predetermined criteria. In various embodiments, the intelligence layer of the router 102 may provide "always on" connectivity to an external network 103 by switching from one external network connection to another. For example, if the Wi-Fi router 102 is connected to the Internet 124 via cable broadband 106, sometimes referred to herein as a third party communications interface, the intelligence layer of router 102 may direct the communication over the licensed communication network 126, when predetermined criteria are met. In various embodiments, the predetermined criteria may be based on quality of service (QoS) of an external network provider, bandwidth constraints, cost per volume communication data transmitted, depletion of allocated account resources, etc.

The intelligence layer of the router 102 may provide load balancing between the third party communications network 106 and the licensed communication network 126 based on predetermined criteria. In various embodiments, load balancing may be based on bandwidth constraints, cost per volume communication data transmitted, and/or the status of account resources (e.g., for both cable broadband and cellular channel accounts).

The intelligence layer of the router 102 may also provide additional security for sensitive communications. To that end, the router may dedicate a channel of communication (e.g., the cable broadband channel or the licensed communications network) for secure communication. Upon the intelligence layer of the router 102 determining that the data received from a UE is sensitive, the intelligence layer of the router 102 selects the dedicated secure communication channel for such communication.

Example Router Components

Figure 2:
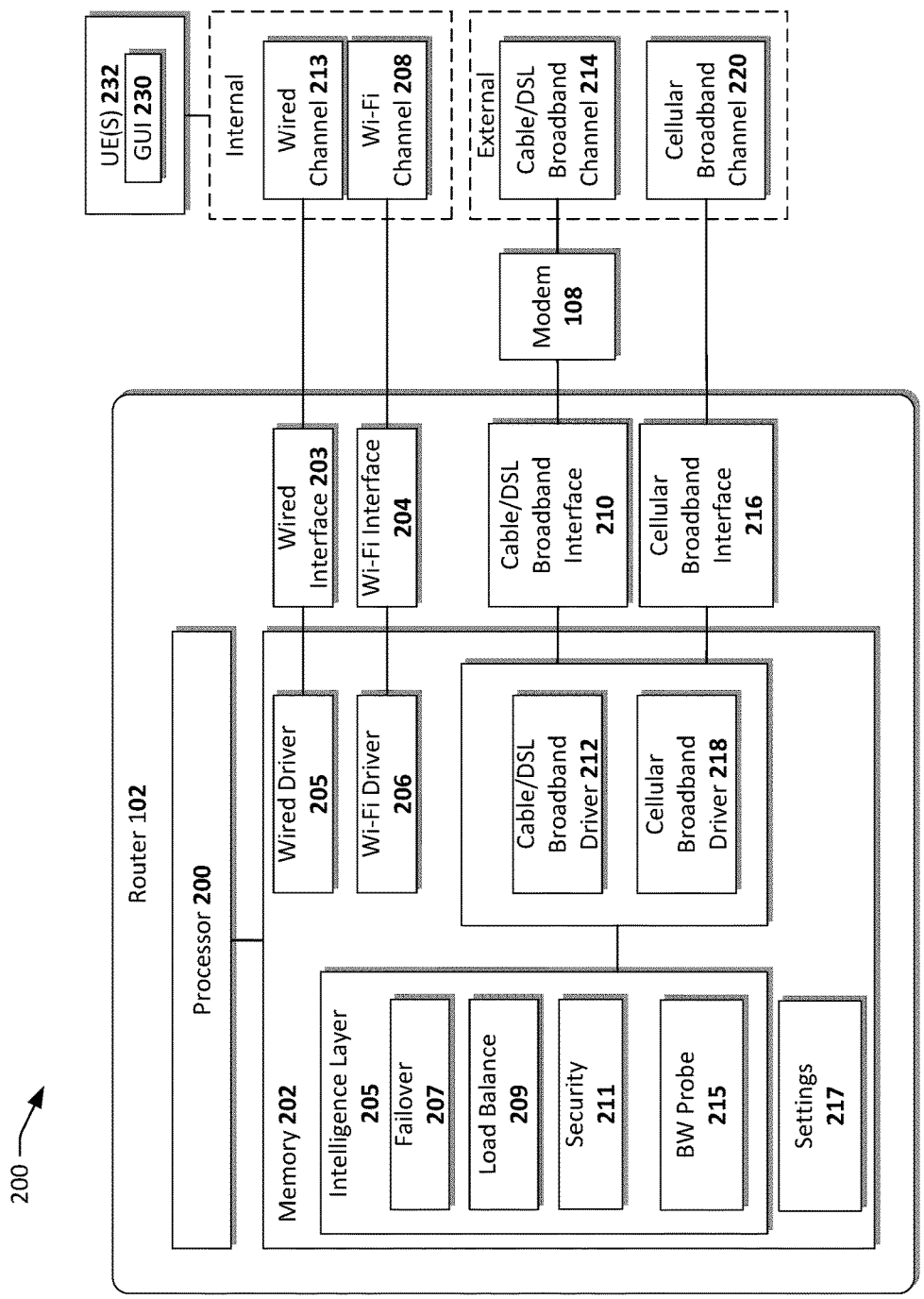
FIG. 2 is a block diagram showing various hardware, software, and communications components of a router, consistent with an exemplary embodiment.

FIG. 2 is a block diagram showing various hardware, software, and communications components of an illustrative router 102. A router 102 may include, inter alia, a processor 200 and a memory 202. Memory 202 of the router 102 may be any computer-readable media that may store several software components in an intelligence layer 205, including a failover software block 207, a load balance software block 209, a security software block 211, and a bandwidth probe 215. In general, a software component is a set of computer executable instructions stored together as a discrete whole.

Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The memory 202 components of the router 102 may include a driver 205 for wired communication, such as Ethernet. The wired interface driver 205 supports a wired interface 203 that can communicate with various UE 232 via a wired channel 213 (e.g., Ethernet). There may be a Wi-Fi driver 206 for wireless communication with one or more UE 232 via a Wi-Fi channel 208. The term Wi-Fi generally refers to a wireless network that is compliant with the IEEE 802.11 series and any successor series of wireless standards. The Wi-Fi communications interface 204 may provide for a plurality of Wi-Fi networks, one of which may be a private Wi-Fi network, which may allow for encryption of router traffic relating to this channel, and one of which may be a guest Wi-Fi network, which may allow router usage to a guest user and which may not allow the guest user to have access to the router's local resources.

The router 102 includes a third party communications driver, which may be a cable or digital subscriber line (DSL) driver 212, that supports a cable or broadband interface 210 respectively. The cable broadband interface 210 may connect via a cable to the cable modem 108, which may provide a cable broadband channel 214 via an ISP 110. Accordingly, the third party communications interface 210 provides broadband access to an external broadband network.

In addition, router 102 includes a licensed communications driver, which may be a cellular broadband driver 218. The cellular broadband driver 218 supports the cellular broadband interface 216 to provide communication over a cellular broadband channel 220. Accordingly, the cellular broadband channel 220 provides an additional broadband access to an external broadband network. As used herein, cellular broadband refers to wireless Internet access delivered through mobile phone towers to a computing device. Accordingly, cellular broadband is used as a synonym for mobile Internet access. In various embodiments, the cellular broadband channel 220 may be used instead of, or in addition to, the cable broadband channel 214, based on a first set of criteria. Similarly, the cable broadband channel 214 can be used instead of, or in addition to, the cellular broadband channel 220, based on a second set of criteria. The actual criteria used will be discussed in more detail later.

The memory of the router 202 may include an intelligence layer 205 that is configured to determine whether to use the cable broadband channel 214 or the cellular broadband channel 220 to route the communication data of the one or more UE 232. In various embodiments, the determination may be based on failover, load balancing, and/or security considerations. To that end, the intelligence layer may include a failover software block 207. As used herein, failover refers to switching to an alternate type of broadband channel upon failure of the active broadband channel, thereby providing continuous (or nearly continuous) availability to a network.

Upon the router 102 receiving communication data from a UE (e.g., 232) either via a wired channel 213 or a wireless (e.g., Wi-Fi) channel 208, the failover block 207 maintains the present broadband channel (e.g., cable 214 or cellular) until one or more predetermined criteria are met, based on a rule set. In various embodiments, the predetermined criteria may be (i) whether the existing broadband channel is meeting the data throughput demand of the router 102 (e.g., indicated by data overflow to an overflow buffer of the router 102), (ii) whether both broadband channels are active or only one broadband channel is active, (iii) and/or whether the alternate (e.g., non-active) broadband channel is available to transmit data. If the predetermined criteria are met, then the communication data traffic is routed to the alternate broadband communication channel. Put differently, the alternate broadband communication channel provides a failover route to maintain continuous (or nearly continuous) data throughput.

It should be noted that having data in the overflow buffer may be indicative that the communication data from the one or more UE 232 not efficiently being transmitted to its destination via the present broadband network (e.g., 214 and/or 220). Put differently, the present broadband channel is not meeting the data throughput demand of the router. Such bottleneck may be due to various reasons. For example, the broadband channel (e.g., 214 and/or 220) may presently have a low bandwidth capacity. Next, the router 102 may be attempting to transmit an excessive amount of data over the one or more broadband channels 214, 220 (e.g., multiple UE's 232 streaming multimedia simultaneously). In another example, one or more user accounts associated with the broadband channels supported by the router 102 may be exceeding predetermined contractual limits (e.g., for the corresponding broadband channel, respectively). For example, a user may have exceeded their bandwidth allotment for the cellular broadband channel 220 and/or the cable broadband channel 214 based on their account subscription(s). Upon determining that a threshold criterion, such as a data cap or time limit, has been reached for a broadband channel, the router 102 directs the data traffic to the alternate broadband channel.

In various embodiments, the status of the bandwidth routed (e.g., consumed) over the cable broadband channel 214 and the cellular broadband channel 220 may be monitored by the router 102 itself or provided by the CRM 130 and CRM 131, respectively. To that end, the CRM 130 and/or CRM 131 may provide the bandwidth consumption data at predetermined intervals or upon reaching a predetermined threshold, respectively.

In one example, the default broadband channel is the cable channel 214 and the failover is the cellular broadband channel 220. Alternatively, the default broadband channel may be the cellular broadband channel 220 and the failover is the cable channel 214. The default broadband channel may be set by the user of the router 102 based on user preferences, such as bandwidth capacity, security, and cost considerations. In various embodiments, the default channel may be set directly via a user interface on the router 102 or via a UE 232 having a graphical user interface (GUI) 230. Such settings may be stored in the settings software block 217 of the memory 202.

In one embodiment, the default channel is based on time periods. For example, a user may enjoy a "free nights and weekends" data plan from the cellular broadband channel 200 provider. In this scenario, the router 102 may be configured to set the cellular broadband channel 220 to be the default broadband channel for predetermined time periods (e.g., between 6 pm and 6 am, as well as weekends) and switch over to the cable broadband channel 214 to be the default broadband channel for the remainder of the time.

The intelligence layer 205 of the router 102 may also include a load balance software block 209 that is operative to balance the data throughput between the cable broadband channel 214 and the cellular broadband channel 220. In various embodiments, the load balancing may be based on a rule set that may define predetermined ratios of data throughput to be assigned to each broadband channel. In one embodiment, the predetermined rules are provided by a user via the settings software block 217 in the memory 202 of the router 102. For example, the ratios between the cable broadband channel and the cellular broadband channel 220 may be 50/50, 25/75, 75/25, etc., which may be automatically adjusted by the router 102 as provided by the bandwidth allocation rule set, based in part on the determined bandwidth capacity (e.g., throughput) of each broadband channel.

To that end, the router 102 may include a bandwidth (BW) probe 215, which is a software component that measures the uplink speed of the router. The BW probe 215 may be configured to probe the router 102 uplink speed at predetermined intervals, to measure average uplink rates, and to store historical data.

For example, the BW probe 215 of the router 102 may connect with (e.g., ping) each broadband channel 214 and 220, to determine the bandwidth capacity of each broadband channel, respectively, and store the data in the memory 202 of the router 102, thereby creating a historical bandwidth log for each broadband channel 214, 220. Such broadband determination may be performed at predetermined intervals and/or upon determining that there is data in the overflow buffer. The data buffering of the router 102 is discussed in more detail later. The historical bandwidth log for each broadband channel 214, 220 and/or the latest broadband data may be used by other components of the memory 202, including the load balance block 209.

In various embodiments, the load balance block 209 may adjust the communication data flow based on the latest broadband data of each broadband channel or based on historic bandwidth averages for a predetermined time period. In various embodiments, the bandwidth allocation rule set may apply a predetermined ratio (e.g., 50/50, 25/75, etc.), maximize the data throughput, or be sensitive to cost considerations per volume of data transmitted. In one embodiment, the load balance block 209 adjusts the data throughput ratio based on data plan considerations. For example, less (or progressively less) communication data may be routed through a broadband channel that is reaching contractual data allotment limits, or more data may be routed through a cellular channel 220 when such data throughput is more cost effective. In one embodiment, only the portion of communication data that is in the overflow buffer is routed over the alternate broadband channel. Put differently, the communication data is routed through the default (e.g., cable broadband channel 214) and only the data found in the overflow buffer is routed to the alternate (e.g., cellular broadband channel 220).

The intelligence layer 205 of the router 102 may also include a security block 211 that is operative to route communication data that it deems to be security sensitive over a more secure broadband channel. For example, a first broadband channel (e.g., cellular broadband channel 220) may be more secure than a second broadband channel (e.g., cable broadband channel 214). In one embodiment, one broadband channel (e.g., channel 220 or 214) may be dedicated to secure communication data while the other broadband channel is used for general digital communication traffic.

In one embodiment, whether the data package from a UE 232 is security sensitive is determined by the header of the communication data. For example, a communication data may be viewed as a data package from a UE 232 that may include an optional header that is placed at the beginning of the payload. The header information may indicate that the payload is to be handled in a secure manner. To that end, the security block 211 may direct such payload over the (e.g., dedicated) secure broadband channel. Accordingly, the security block 211 is operative to inspect data packets and assigns data packets that are deemed to be security sensitive to be routed over a secure broadband channel, while routing the remaining communication data over the alternate broadband channel. In various embodiments, the secure channel may be the cellular channel 220 or the cable broadband channel 214.

Example Failover and Load Balancing Using Buffer Components

Figure 3:
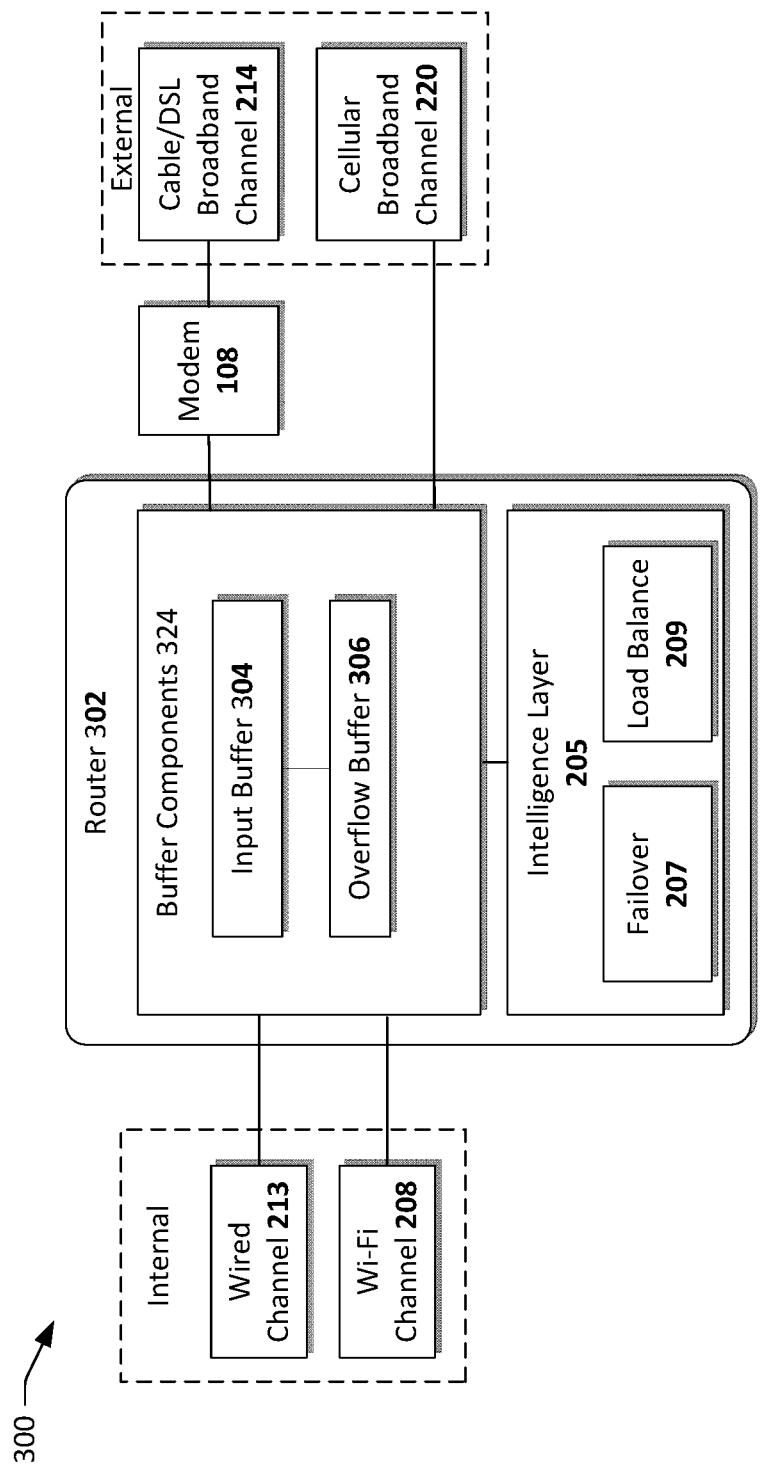
FIG. 3 is a block diagram including buffer components of an illustrative router 302.

FIG. 3 is a block diagram including buffer components of an illustrative router 302. The components of router 302 are substantially similar to those of FIG. 2 and are therefore not repeated here for brevity. The Router 302 includes buffer components 324 and an intelligence layer 205. The intelligence layer 205 comprises one or more software blocks, such as failover 207, load balance 209, and security 211. The buffer components 324 include an input buffer 304 and an overflow buffer 306.

During the course of regular operation, the input buffer 304 of the router 302 is populated with communication data received from one or more UE via an internal wired channel 213 (e.g., Ethernet) and/or Wi-Fi channel 208. That communication data is then routed to an external broadband channel, such as cable broadband channel 214 via modem 108, cellular broadband channel 220, or a combination of both, based on various ratios. The communication data traffic is routed based on decisions made by the intelligence layer 205 as defined by on one or more rule sets.

In one embodiment, when the router 302 output bandwidth is exceeded, the excess data from the input buffer 304 is transferred to the overflow buffer 306. As noted above, having data in the overflow buffer 306 is indicative that there is a bottleneck in the communication data throughput. Put differently, the one or more presently used broadband network(s) (e.g., 214 and/or 220) are not meeting the bandwidth demand of the router 302. In this regard, the intelligence layer 205 can provide different solutions based on different predetermined criteria. In a situation where a single external broadband channel is used (e.g., cable broadband channel 214 or cellular broadband channel 220), the failover block 207 may route the communication data traffic to the alternate (e.g., non-active) broadband channel. To that end, the failover block 207 determines whether the alternate broadband channel is available to transmit the communication data to its destination.

In various embodiments, the predetermined criteria may include (i) whether communication data has overflown into an overflow buffer 306 of the router 302, (ii) whether both broadband channels are active or only one broadband channel is active, (iii) and/or whether the alternate (e.g., non-active) broadband channel is available to transmit data. If the predetermined criteria are met, then the communication data traffic is switched to the alternate broadband communication channel, thereby providing continuous (or nearly continuous) availability to an external broadband channel.

In one embodiment, a failover includes an additional criterion, namely that the alternate broadband channel has a bandwidth capacity that is above a predetermined factor "N" higher than the active broadband channel (e.g., N=4). Thus, in this embodiment, failover occurs when $BW_2 \geq N \times BW_1$, where $BW_1$ is the bandwidth of the presently selected channel and $BW_2$ is the bandwidth of the alternate channel, as would be the case, for example, when the presently selected channel is severed or substantially limited. In one embodiment, when the alternate broadband channel is not faster by factor N, then the failover block 207 may defer to the load balance block 209 to provide appropriate load balancing between the presently selected broadband channel and the alternate broadband channel. In this regard, the load balance block 209 may instruct the router 302 to maintain the present external broadband channel, but route a portion of the traffic over the alternate broadband channel. In various embodiments, the portion of the communication data traffic to be routed over the alternate broadband channel may be the data in the overflow buffer or a fraction of the overall communication data based on predetermined criteria of the load balance block 209 rule set.

Accordingly, the intelligence layer 205 of the router 302 may include a load balance software block 209 that is operative to balance the data throughput between the cable broadband channel 214 and the cellular broadband channel 220. To that end, the load balance block 209 may dynamically adjust the data throughput over the multiple broadband channels. In various embodiments, the load balancing block may be (i) typically "ON" (e.g., active) to improve the efficiency (e.g., in cost and/or speed) of the data throughput via the multiple broadband channels or (ii) may be triggered when there is data in the overflow buffer, to mitigate communication data traffic bottlenecks. Put differently, the load balance block 209 may operate independent of there being overflow data in the overflow buffer 306.

Example Call Flow Processes

Figure 4:
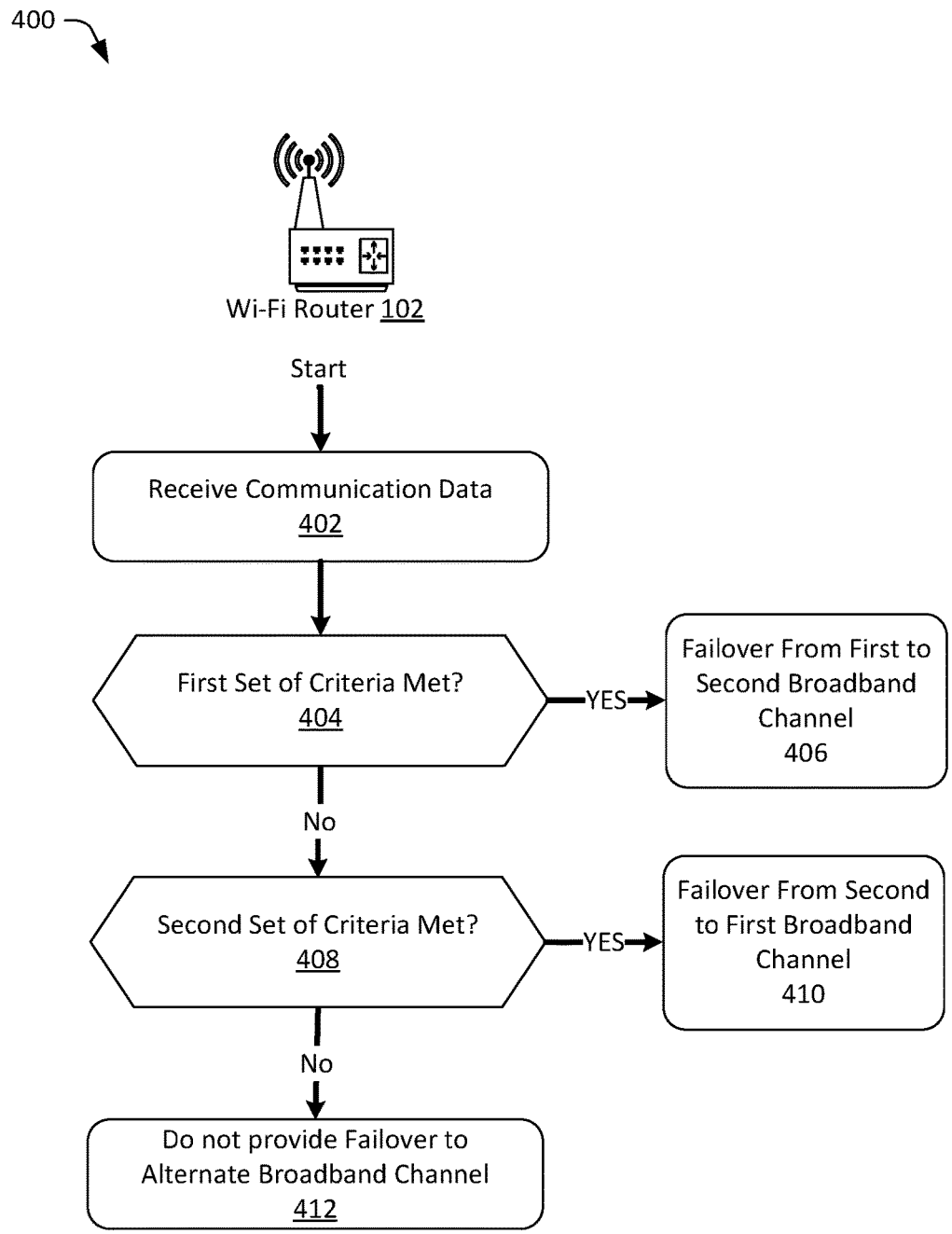
FIG. 4 illustrates a high level example call flow for a failover from an existing broadband channel to an alternate broadband channel.
Figure 5:
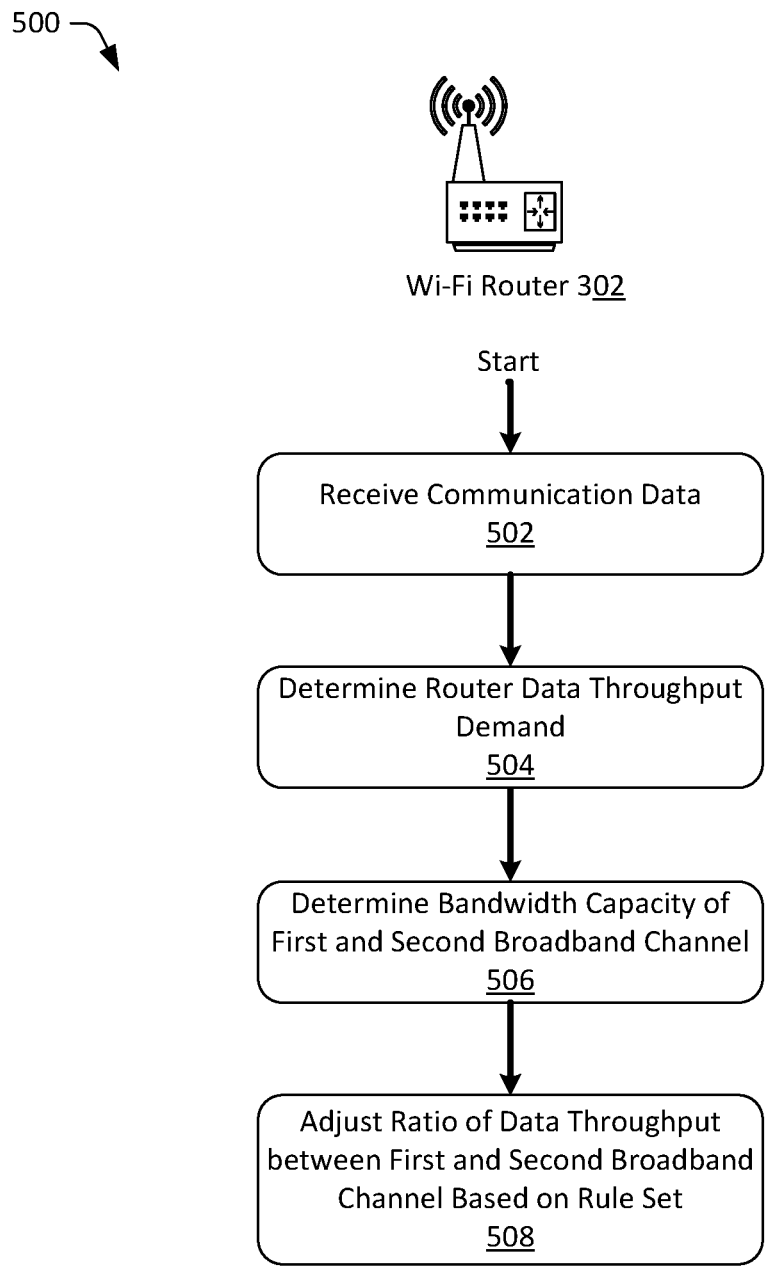
FIG. 5 illustrates a high level example call flow for a load balancing of the throughput of a router over several external broadband channels.
Figure 6:
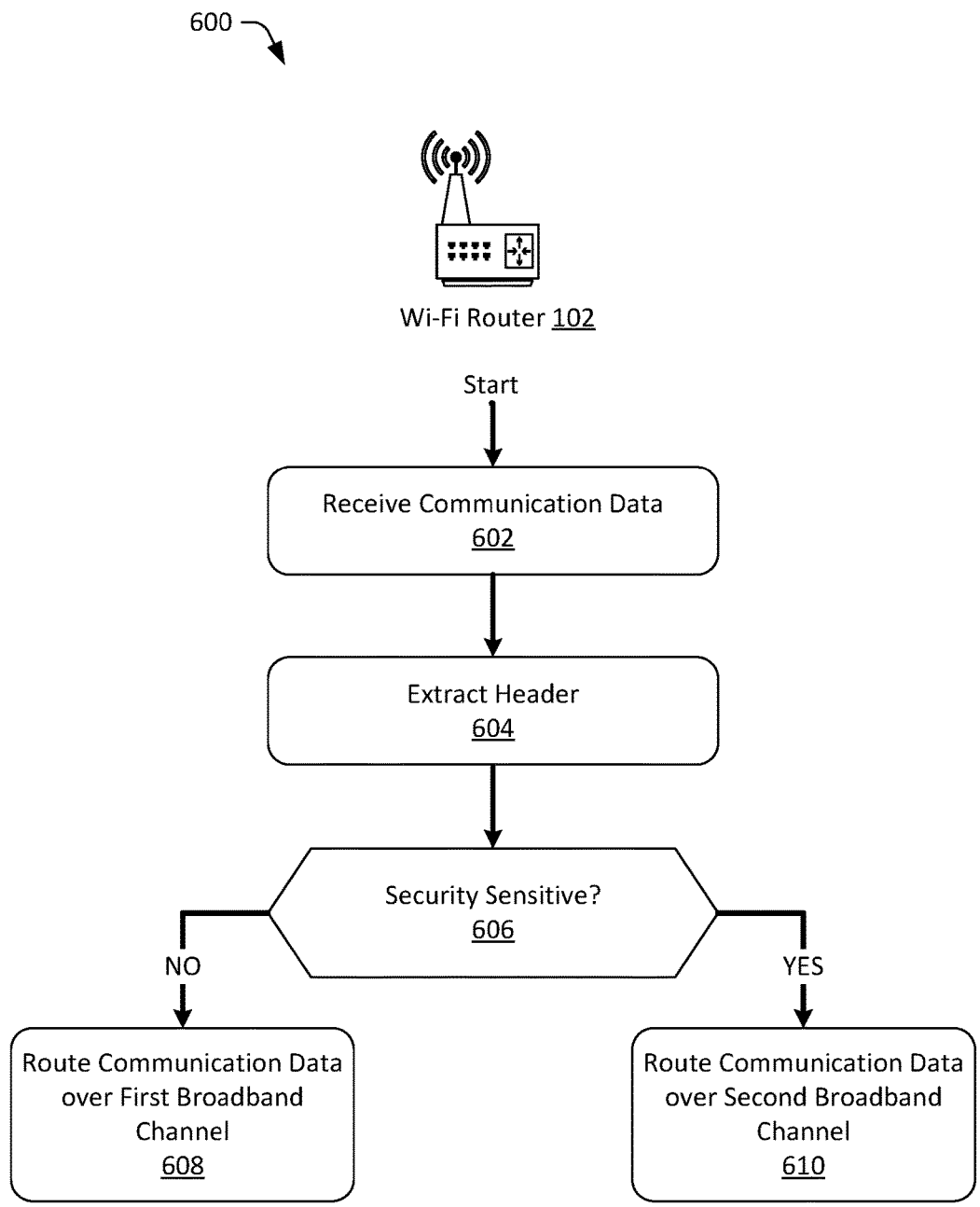
FIG. 6 illustrates a high level example call flow for a security hardening of a router.

With the foregoing overview of the router system 100 and the various components of example routers 102 and 302, it may be helpful now to consider a high-level discussion of example call flow processes. To that end, FIGS. 4, 5, and 6 illustrate high level example call flow processes for optimizing the throughput of a router based on different rule sets. In particular, FIG. 4 illustrates a high level example call flow for a failover from an existing broadband channel to an alternate broadband channel. FIG. 5 illustrates a high level example call flow for a load balancing of the throughput of a router over several external broadband channels. FIG. 6 illustrates a high level example call flow for a special handling of security sensitive communication data. The call flow processes 400, 500, and 600 are illustrated as a collection of blocks in logical flows, which each represents a sequence of operations that can be implemented in hardware, software, or a combination thereof.

In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 400, 500, and 600 are described with reference to system 100 of FIG. 1 and the router of FIGS. 2 and 3.

Example Failover Process

At block 402, the Wi-Fi router 102 receives communication data from various UE (e.g., 232) either via a wired channel 213 or a wireless (e.g., Wi-Fi or Bluetooth) channel 208. Typically, the communication data populates an input buffer 304 before it is routed over a first or second broadband channel, such as cable broadband channel 214 or cellular broadband channel 220.

At block 404 the intelligence layer 205 in the memory 202 of the router 102 determines whether a first set of criteria are met. More particularly, this determination may be performed by the failover block 207 of the intelligence layer 205. The first set of criteria may comprise: (i) the first broadband channel is the selected broadband channel, (ii) the first broadband channel is not meeting the data throughput demand of the router; and (iii) the second broadband channel is available to transmit the communication data. To facilitate this discussion, it will be assumed that the first broadband channel is the cable broadband channel 214 and the second broadband channel is the cellular broadband channel 220.

In one embodiment, whether the first broadband channel is not meeting the data throughput demand of the router is indicated by data overflow from the input buffer 304 to the overflow buffer 306.

In one embodiment, the indicia of whether the second broadband channel is available to transmit the communication data may be provided by a BW probe 215 that is configured to determine the bandwidth capacity of each broadband channel and store the determined bandwidth capacity in a historical broadband bandwidth log. The latest broadband log for the second broadband channel may be used to determine whether the second broadband channel is available to transmit communication data.

If the first set of criteria are met (i.e., "YES", at decision block 404), the process continues with block 406 where communication traffic is routed from the first broadband channel to the second broadband channel.

However, if the first set of criteria are not met (i.e., "NO", at decision block 404), the process continues with block 408, where the intelligence layer 205 determines whether the second set of criteria are met. The second set of criteria may comprise: (i) the second broadband channel is the selected broadband channel, (ii) the second broadband channel is not meeting the data throughput demand of the router; and (iii) the first broadband channel is available to transmit the communication data. Similar to the determination for the first set of criteria, the overflow buffer and the corresponding data from the BW probe 215 may be used for the second set of criteria.

If the first set of criteria are met (i.e., "YES", at decision block 408), the process continues with block 406, where communication traffic is routed from the second broadband channel to the first broadband channel, thereby providing continuous (or nearly continuous) communication data broadband throughput.

However, if the first set of criteria are not met (i.e., "NO", at decision block 408), the intelligence layer 205 determines that a failover to an alternate broadband channel is not appropriate. Other options, such as load balancing and/or secure routing may still be applicable.

Example Load Balance Process

Reference now is made to FIG. 5, which illustrates a high level example call flow for a load balancing of the throughput of the router 102 of FIG. 2 and router 302 of FIG. 3. In various embodiments, flow 500 may stand on its own, be a continuation of flow 400, or precede flow 400.

At block 502, as discussed in the context of flow 500, the Wi-Fi router 102 receives communication data from various UE (e.g., 232) either via a wired channel 213 or a wireless (e.g., Wi-Fi or Bluetooth) channel 208.

At block 504, the intelligence layer 205 in the memory 202 determines the data throughput demand of the router 302. To that end, the load balance block 209 of the intelligence layer 205 may calculate the bandwidth requirements of the router 302 by measuring the amount of data received in the input buffer 304 during a predetermined time period.

At block 506, the intelligence layer 205 determines the bandwidth capacity of the first and second broadband channels. For example, the BW probe 215 may ping each broadband channel 214 and 220 to determine the bandwidth capacity of the first broadband channel and the second broadband channel. This data may be stored in the memory 202 of the router 302 to create a historical bandwidth log for each broadband channel. In various embodiments, the load balance block 209 may refer to the historical data (e.g., average over a predetermined time period) or the latest broadband data.

At block 508, the ratio of the data throughput between the first and second broadband channel is adjusted based on a bandwidth allocation rule set. As discussed previously, the bandwidth allocation rule set of the load balance block 209 includes definitions of criteria for adjusting the ratio of the data throughput. In various embodiments, the bandwidth allocation rule set may comprise different definitions of criteria for adjusting the data throughput ratio. In one example, the criteria may be based on decreasing data throughput over the first or second broadband channel upon approaching or meeting a threshold data allotment limit for the first or second broadband channel, respectively. To that end, the CRM 130 and/or CRM 131 may provide the bandwidth consumption data at predetermined intervals or upon reaching a predetermined threshold.

In another example, the criteria may be based on providing a maximum data throughput for the router. In this regard, the load balance block uses the determined bandwidth capacity of the first and second broadband channel (of block 506) to calculate what ratio of data throughput between the first broadband channel and the second broadband channel would provide maximum data throughput. The ratio is adjusted accordingly.

In another example, the criteria may be based on providing data throughput at a lowest cost per a volume of communication data transmitted over broadband. In this regard, the load balance block 209 may refer to the settings block 217 that may provide cost considerations, including data allotment limits. In various embodiments, these parameters may be provided by the user of the router or may be provided by the CRM 130 and/or CRM 131 for the first broadband channel and the second broadband channel, respectively. For example, a larger ratio (or even the entire communication data throughput) may be routed over the broadband channel that is more cost effective per volume data flow.

Example Secure Data Handling Process

Reference now is made to FIG. 6, which illustrates a high level example call flow for a secure handling of security sensitive communication data of the router of FIG. 1. In various embodiments, flow 600 may stand on its own, be a continuation of flow 400 and/or 500, or precede flow 400 and/or 500. In the example flow 600 it is assumed that the first broadband channel, which may be a cable broadband channel 214, is a default broadband channel, and the second broadband channel, which may be a cellular broadband channel 220, is used for communication data that is deemed to be security sensitive.

At block 602, as discussed in the context of flow 400 and 500, the Wi-Fi router 102 receives communication data from various UE (e.g., 232) either via a wired channel 213 or a wireless (e.g., Wi-Fi or Bluetooth) channel 208. The communication data may be viewed as digital data packets that may comprise a header portion and a payload portion. It should be noted that not all data packets include a data header. However, the data packets that are to be handled in a secure manner include a data header with a signature that is indicative of the sensitivity of the data packet.

At block 604, the header portion is extracted from the communication data packet and inspected for content by the intelligence layer 205 of the memory 202. More particularly, this determination may be performed by the security block 211 of the intelligence layer 205.

At block 606, the security block 211 determines whether the communication data packet is to be handled securely, based on the signature of the header. Upon determining that the criteria is not met (i.e., "NO" at decision block 606), the process continues with block 608, where the communication data packet is routed over the first broadband channel. Put differently, since the communication data is not deemed to be security sensitive, it is routed over the "regular" broadband channel.

However, upon determining that the criteria is met (i.e., "YES" at decision block 606), the process continues with block 610, where the communication data packet is routed over the second broadband channel. Thus, the communication data that is deemed to be security sensitive is routed over the more secure broadband channel, thereby assuring a secure handling of the communication data.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

It is understood that the receipt of the account information from CRM 130, 131 is performed upon subscriber approval. It is understood that any specific order or hierarchy of steps in the processes disclosed in FIGS. 4, 5, and 6 are illustrations of exemplary approaches. Based upon design preferences, it is understood that the specific order or hierarchy of steps in the processes may be rearranged, expanded, and some steps omitted. Some of the blocks may be performed simultaneously. For example, in flow 400 the action of determining whether the first set of criteria are met can be performed before, at the same time, or after the second set of criteria are met. Similarly, in flow 500, the determination of router demand can be performed before, at the same time, or after the determination of the bandwidth capacity of the first and second broadband channels. Further, each of the process flows 400, 500, and 600 may be performed independently or in any combination thereof in series.

While the term "cable broadband" is used herein, it will be understood that DSL broadband is supported as well. Accordingly, as used herein, the term "cable broadband" includes the meaning of cable broadband or DSL broadband.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A router, comprising:
   a processor;
   a memory communicatively coupled to the processor;
   a first network interface coupled to the processor and configured to enable communication via a first broadband channel;
   a second network interface coupled to the processor and configured to enable communication via a second broadband channel;
   an intelligence layer comprising one or more applications stored in the memory, wherein execution of the one or more applications by the processor configures the router to perform acts comprising:
   upon determining that a first set of criteria have been met, switching a communication data to the second broadband channel, wherein the first set of criteria comprises:
      the first broadband channel is a selected broadband channel;
      the first broadband channel is not meeting a communication data throughput demand of the router; and
      the second broadband channel is available to transmit the communication data;

upon determining that a second set of criteria have been met, switching the communication data to the first broadband channel, wherein the second set of criteria comprises:
the second broadband channel is a selected broadband channel;
the second broadband channel is not meeting the communication data throughput demand of the router; and
the first broadband channel is available to transmit the communication data; and
upon determining that the first and second set of criteria are not met, adjusting a ratio of the communication data throughput between the first broadband channel and the second broadband channel based on a bandwidth allocation rule set.

2. The router of claim 1, wherein:
the first broadband channel is one of a cable or digital subscriber line (DSL) broadband channel; and
the second broadband channel is a cellular broadband channel.

3. The router of claim 1, wherein the router is configured to provide a continuous communication data throughput upon a failure of the first or second broadband channel.

4. The router of claim 1, wherein whether a first or second broadband is meeting the communication data throughput of the router is defined by data overflowing from an input buffer to an overflow buffer of the router.

5. The router of claim 1, wherein the bandwidth allocation rule set comprises a predetermined communication data throughput ratio between the first broadband channel and the second broadband channel.

6. The router of claim 1, wherein the bandwidth allocation rule set comprises one of:
(i) decreasing the communication data throughput over the first or second broadband channel upon approaching or meeting a threshold data allotment limit for the first or second broadband channel, respectively;
(ii) providing a maximum communication data throughput; or
(iii) providing communication data throughput at a lowest cost per a volume communication data transmitted.

7. The router of claim 1, wherein:
the first set of criteria further comprises: the second broadband channel has a bandwidth capacity that is a predetermined factor N times higher than a bandwidth capacity of the first broadband channel; and
the second set of criteria further comprises: the first broadband channel has a bandwidth capacity that is the predetermined factor N times higher than the bandwidth capacity of the second broadband channel.

8. A router, comprising:
a processor;
a memory communicatively coupled to the processor;
a first network interface coupled to the processor and configured to enable communication via a first broadband channel;
a second network interface coupled to the processor and configured to enable communication via a second broadband channel;
an intelligence layer comprising one or more applications stored in the memory, wherein execution of the one or more applications by the processor configures the router to perform acts comprising:
upon determining that a first set of criteria have been met, switching a communication data to the second broadband channel, wherein the first set of criteria comprises:
the first broadband channel is a selected broadband channel;
the first broadband channel is not meeting a communication data throughput demand of the router; and
the second broadband channel is available to transmit the communication data;
upon determining that a second set of criteria have been met, switching the communication data to the first broadband channel, wherein the second set of criteria comprises:
the second broadband channel is a selected broadband channel;
the second broadband channel is not meeting the communication data throughput demand of the router; and
the first broadband channel is available to transmit the communication data; and
upon determining that the first and second set of criteria are not met:
inspecting a content of a header portion of the communication data; and
upon determining that the communication data is security sensitive based on the content of the header portion, setting the communication data to be routed over the second broadband channel.

9. The router of claim 8, wherein:
the first broadband channel is one of a cable or digital subscriber line (DSL) broadband channel; and
the second broadband channel is a cellular broadband channel.

10. The router of claim 8, wherein the router is configured to provide a continuous communication data throughput upon a failure of the first or second broadband channel.

11. The router of claim 8, wherein whether a first or second broadband is meeting the communication data throughput of the router is defined by data overflowing from an input buffer to an overflow buffer of the router.

12. The router of claim 8, wherein:
the first set of criteria further comprises: the second broadband channel has a bandwidth capacity that is a predetermined factor N times higher than a bandwidth capacity of the first broadband channel; and
the second set of criteria further comprises: the first broadband channel has a bandwidth capacity that is the predetermined factor N times higher than the bandwidth capacity of the second broadband channel.

13. A router, comprising:
a processor;
a memory communicatively coupled to the processor;
a first network interface coupled to the processor and configured to enable communication via a first broadband channel;
a second network interface coupled to the processor and configured to enable communication via a second broadband channel;
an intelligence layer comprising one or more applications stored in the memory, wherein execution of the one or more applications by the processor configures the router to perform acts comprising:
upon determining that a first set of criteria have been met, switching a communication data to the second broadband channel, wherein the first set of criteria comprises:

the first broadband channel is a selected broadband channel;

the first broadband channel is not meeting a communication data throughput demand of the router; and the second broadband channel is available to transmit the communication data; and the second broadband channel has a bandwidth capacity that is a predetermined factor N times higher than a bandwidth capacity of the first broadband channel;

upon determining that a second set of criteria have been met, switching the communication data to the first broadband channel, wherein the second set of criteria comprises:

the second broadband channel is a selected broadband channel;

the second broadband channel is not meeting the communication data throughput demand of the router; and the first broadband channel is available to transmit the communication data; and the first broadband channel has a bandwidth capacity that is the predetermined factor N times higher than the bandwidth capacity of the second broadband channel.

14. The router of claim 13, wherein:

the first broadband channel is one of a cable or digital subscriber line (DSL) broadband channel; and the second broadband channel is a cellular broadband channel.

15. The router of claim 13, wherein the router is configured to provide a continuous communication data throughput upon a failure of the first or second broadband channel.

16. The router of claim 13, wherein whether a first or second broadband is meeting the communication data throughput of the router is defined by data overflowing from an input buffer to an overflow buffer of the router.

17. The router of claim 13, wherein execution of the one or more applications by the processor configures the router to perform acts comprising:

upon determining that the first and second set of criteria are not met, adjusting a ratio of the communication data throughput between the first broadband channel and the second broadband channel based on a bandwidth allocation rule set.

18. The router of claim 17, wherein the bandwidth allocation rule set comprises a predetermined communication data throughput ratio between the first broadband channel and the second broadband channel.

19. The router of claim 17, wherein the bandwidth allocation rule set comprises one of:

(i) decreasing the communication data throughput over the first or second broadband channel upon approaching or meeting a threshold data allotment limit for the first or second broadband channel, respectively;

(ii) providing a maximum communication data throughput; or (iii) providing communication data throughput at a lowest cost per a volume communication data transmitted.

20. The router of claim 13, wherein execution of the one or more applications by the processor configures the router to perform acts comprising:

upon determining that the first and second set of criteria are not met:

inspecting a content of a header portion of the communication data; and upon determining that the communication data is security sensitive based on the content of the header portion, setting the communication data to be routed over the second broadband channel.

* * * * *